United States Patent [19]

Seiller Pierre F. X.

[11] 4,299,241
[45] Nov. 10, 1981

[54] HINGE FOR HAIR CLIP, BARRETTE OR THE LIKE

[76] Inventor: Seiller Pierre F. X., Proulieu-Lagnieu (Ain), France

[21] Appl. No.: 896,393

[22] Filed: Apr. 14, 1978

[30] Foreign Application Priority Data

Apr. 15, 1977 [FR] France ............................ 77 11968

[51] Int. Cl.³ ............................................. A45D 8/24
[52] U.S. Cl. ............................................... 132/48 R
[58] Field of Search .......................... 132/48 R, 46, 83

[56] References Cited

U.S. PATENT DOCUMENTS

| 1,422,464 | 7/1922 | Meserole | 132/48 R |
| 2,618,278 | 11/1952 | Struppe | 132/48 R |
| 3,676,902 | 7/1972 | Pearson | 132/48 A |

FOREIGN PATENT DOCUMENTS

| 9801 | 2/1909 | France | 132/48 R |
| 560633 | 7/1923 | France | 132/48 R |
| 615093 | 10/1926 | France | 132/48 R |
| 113193 | 2/1918 | United Kingdom | 132/48 R |

Primary Examiner—G. E. McNeill
Attorney, Agent, or Firm—Karl F. Ross

[57] ABSTRACT

A hinge for a barrette, hairclip or the like has a base of rectangular configuration formed along its short ends with a pair of upstanding lugs forming cheeks between which the legs of a clip arm are retained. The legs have inwardly bent feet which are engaged between a pair of cleats extending along the long sides of the base and bent over these feet to swingably mount the arm.

5 Claims, 7 Drawing Figures

HINGE FOR HAIR CLIP, BARRETTE OR THE LIKE

FIELD OF THE INVENTION

The present invention relates to a hinge joint for clip-like members in general and, more particularly, for a hairclip, barrette or like article of adornment.

BACKGROUND OF THE INVENTION

In the jewelry, garment and adornment fields, in general, and in many other applications it is desirable to provide a hinge between a wire swinging member and a body or other structure. In such cases, the wire can be bent into a hairpin configuration with the legs having inwardly turned feet defining the pintle of the hinge and hence the swinging axis thereof.

Thus, while the present invention will be described in connection with a hair clip or barrette, it should be understood that it is also applicable to other systems wherever a bent wire arm, clip or the like may be swingably connected to another element.

In a barrette or hair clip the "other element" is usually an elongated body, e.g. of synthetic-resin material, of an esthetic or decorous configuration, coloration and/or pattern and is held in place in the hair of the wearer by a hairpin-like arm which is swingably connected at one end to this body on the reverse side thereof. The body may be bowed so that the concavity is spanned by this arm which is concealed by the hair so that only the obverse side of the article is exposed to view.

At the other end of this body, there may be provided a retaining member adapted to be straddled by the legs of the clip-like arm to secure the barrette in place in the hair.

The instant disclosure deals with improvements in the hinge joint for systems of the aforedescribed type.

Where the feet defining the axis of the hinge are bent at right angles to the legs of the arm and are swingably mounted in a hinge-forming fitting in accordance with prior-art principles, it has been found that the two parts, namely, the leg and the support, have the tendency to shift relatively. To avoid this displacement and ultimate separation or dislocation of the hinge, it is common practice to provide the arm with an additional piece shaped to retain the feet in place relative to the support fitting. While this arrangement allowed the hinge to be used effectively, it has the disadvantage that manufacturing costs are increased by the additional piece, the mounting of the added piece increases the number of operations necessary to fabricate the unit, and there is a possibility that the additional piece will be lost and the functioning of the hinge disadvantaged.

OBJECTS OF THE INVENTION

It is the principal object of the present invention to provide a hinge, especially for barrettes, hair clips and like articles but also for other systems using a bent-wire swinging arm, whereby the aforedescribed disadvantages are obviated and the need for an additional and separately mounted piece for retaining the arm in place is eliminated.

Another object of the invention is to provide a barrette or hair clip with an improved hinge.

Still another object of the invention is to provide an improved method of making a hinge joint.

SUMMARY OF THE INVENTION

These objects and others which will become apparent hereinafter are attained, in accordance with the present invention, with a hinge, especially for a barrette or hair clip in which the hinge fitting or support is formed with a rectangular base along the long sides of which there project from one surface of the base two cleats which are spaced inwardly of the ends of the base. On the ends of the base and along the short sides thereof there project a pair of lugs from the same side of the base to define a pair of cheeks spaced from the ends of the cleats. The two cleats are initially substantially parallel and adapted to receive the feet of the bent-wire pivotal element between them, whereupon the cleats are bent over toward one another so as to arch around the circular cross-section wire and engage the latter to define the pivotal axis thereof. The two cheeks ensure lateral retention of the feet within the cylindrical passage defined by the bent-over cleats.

The two cleats, which are originally spaced apart over their entire heights by a distance approximately equal to the diameter of the wire can have a decreasing thickness toward their fee extremeties, i.e. can be of progressively reduced cross section away from the base so that the upstanding cleats constitute the shanks of a U-cross section of the fitting before the wire feet are inserted. When the wire is inserted and the free ends of the cleats are clenched around the wire, the two cleats together define a practically closed eye in which the feet are received. The cheeks can be spaced from the ends of the cleats by a distance equal to substantially the diameter of the wire so that the feet have, along the axis of the hinge, practically no play. This completely eliminates any need for an additional member on the swinging arm for retaining the same in place.

The base or fitting can be provided, according to the invention, with a plurality of projections or tenons, preferably of T-shape and lying in planes perpendicular to the plane of the base but parallel to the planes of the cheeks and perpendicular to the axis of the hinge, these tenons projecting from the side of the base opposite that on which the cleats and lugs are formed to constitute anchors which are embedded in the body of the barrette or hair clip to secure the fitting in place. These tenons may be disposed at the ends of the base or may project from intermediate locations inwardly of these ends.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
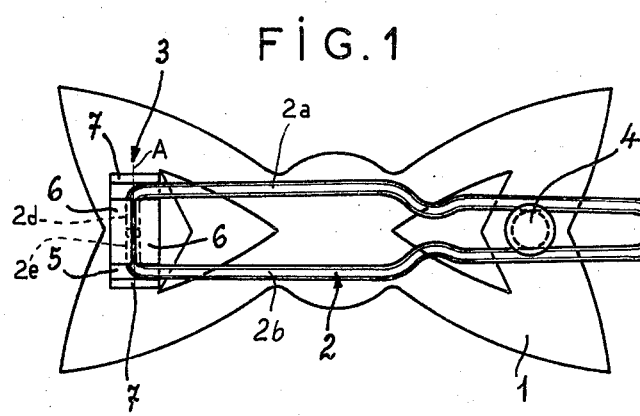
FIG. 1 is a rear-elevational view of a barrette according to the present invention.
Figure 2:
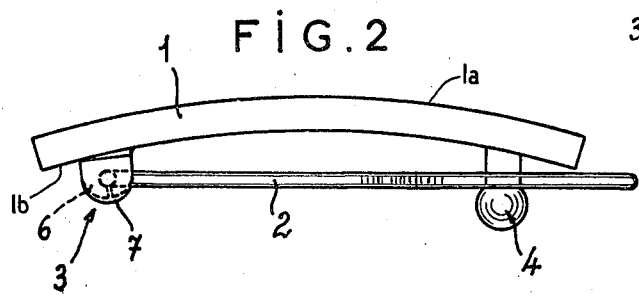
FIG. 2 is a side-elevational view of the barrette.

In FIGS. 1 and 2 I have shown a barrette which comprises a body 1 of thermoplastic synthetic-resin material having an esthetic configuration and/or color, in this case, the shape of a bow. The elongated body 1 is curved so as to have a convex obverse side 1a and a concave reverse side 1b, the latter being spanned by a clip 2 forming the pivotal arm and adapted to retain the body 1 on the hair of the user.

The element 2 is, as can be seen from FIG. 1, of hairpin configuration, i.e. it has a pair of inwardly biased legs 2a and 2b which can be deflected outwardly, i.e. spread apart, to clear a retaining member shown at 4 and anchored in the body 1 at the right-hand end thereof. The legs 2a and 2b terminate in a bight 2c at the free end of the arm 2.

The retaining member 4, which is preferably composed in one piece from metal or a die-casting alloy such as ZAMAC and is solid, is produced by turning or die-casting. More particularly, the retaining member 4 has the configuration described in the commonly owned concurrently filed copending application Ser. No. 896,392.

The opposite end of the clip 2 is hinged via a fitting 3 to the body 1. The hinge fitting 3 receives the inwardly turned ends 2d and 2e of the legs 2a and 2b, respectively, which feet are bent at right angles to the legs. They thus define the axis A of the hinge.

Figure 5:
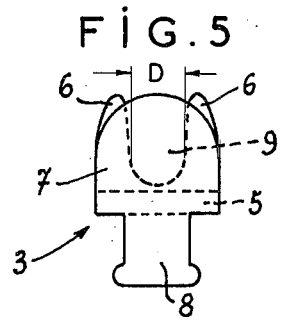
FIG. 5 is an end view of the fitting of FIGS. 3 and 4.

The fitting 3, according to the invention, is formed with a rectangular base 5 elongated parallel to the axis A. The base 5 is provided, along its two long sides but inwardly of the ends, with a pair of upstanding cleats 6 (see especially FIG. 5) having a spacing D which is substantially equal to the diameter of the wire constituting the member 2.

Figure 3:
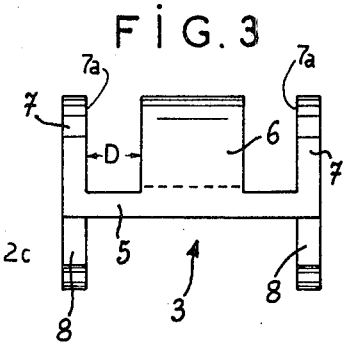
FIG. 3 is a side-elevational view of the hinge fitting of the present invention drawn to a greatly enlarged scare and without the clip in place.
Figure 4:
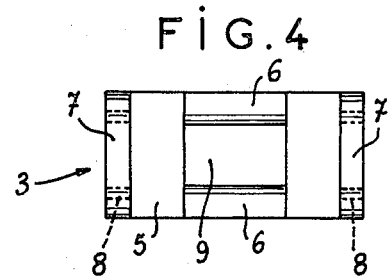
FIG. 4 is a top view of the fitting of FIG. 3.

Along the two short sides of the rectangular base 5, there are provided a pair of upstanding lugs 7 whose surfaces 7a form cheeks spaced by a distance D from the respective end of the cleats 6 (see especially FIG. 3). Thus the cleats 6 are flanked spacedly by the lugs 7.

Figure 6:
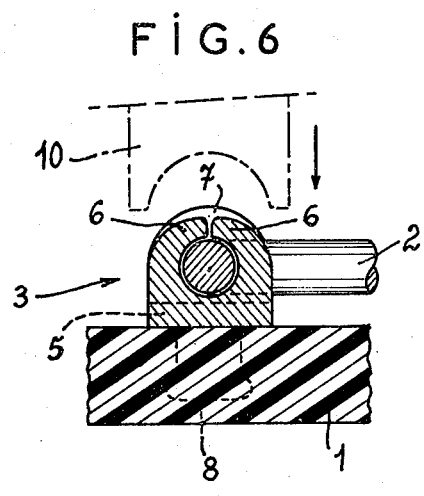
FIG. 6 is a cross-sectional view through the fitting of the hinge with the bent wire in place, showing the tool for the setting operation in dot-dash lines.
Figure 7:
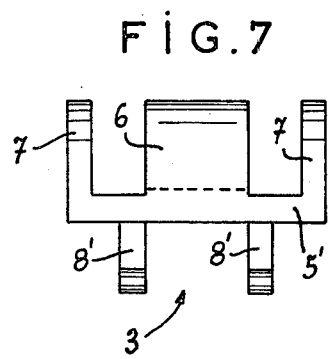
FIG. 7 is a view similar to FIG. 3 but illustrating another embodiment of a hinge joint according to the invention.

The base 5 is also formed unitarily with a pair of tenons 8 which project in the opposite direction and from the opposite side of the base to enable the same to be anchored by embedding in the synthetic-resin material of the body 1 (see FIG. 6). In the embodiment of FIG. 3, these tenons 8 are of T-shape and are disposed at the ends of the base 5 whereas the tenons 8' in the embodiment of FIG. 7 are spaced apart but are disposed inwardly of the ends of the base 5'.

The hinge fitting 3 is constituted of metal or a die-casting alloy such as ZAMAC and is preferably produced by injection-molding, die-casting or like techniques which avoid material-removal machining techniques. As can be seen from FIG. 5, the two cleats 6 are initially substantially parallel to one another and have flanks which confront one another but extend generally transverse to the plane of the base 5. The cleats form a U-section channel 9 as has been shown in FIG. 5.

The fitting 3 is set hot into the thermoplastic material 1 and is anchored therein by the tenons 8 and their lateral teeth as has been shown in FIG. 6. During the setting process, the setting tool 10, i.e. a die, bends the free upper extremities of the cleats 6 inwardly and around the feet 2d and 2e which have previously been laid into the channel 9 with the cheeks 7a flanking the legs 2a and 2b at the bents between the feet and the legs. Thus the lugs 6 constitute lateral retainers for the clip 2 preventing all axial play.

Of course, the hinge joint described is not limited to barrettes but is also applicable wherever an arm is to be pivotally mounted on a body, for example, for the mounting of spectacle temples on an eyeglass frame.

I claim:

1. A hinge fitting for making a hinge between a bent-wire arm and a body, said hinge fitting comprising a rectangular base, a pair of cleats projecting from one side of said base along the longitudinal edges thereof inwardly of the ends of the base unitarily therewith and adapted to receive a wire between them, and a pair of nonperforated lugs projecting upwardly from said side of said base along the short edges thereof outwardly of said cleats and unitary with the base to define imperforate cheeks spaced from said cleats and limiting axial displacement of said wire between said cleats, said cleats being bent toward one another over said wire to pivotally receive the same, said base being formed with a pair of tenons projecting from the opposite side thereof and adapted to be anchored in said body, said cleats defining a U-section channel with said base in cross section through said base.

2. The hinge fitting defined in claim 1 wherein said fitting is formed by injection molding.

3. The hinge fitting defined in claim 1 wherein said tenons are coplanar with said lugs.

4. The hinge fitting defined in claim 1 wherein said tenons are spaced inwardly from the ends of said base.

5. A barrette comprising:
an elongated synthetic-resin body having an obverse side and a reverse side;
a hinge fitting anchored in said body at one end thereof and said reverse side, said hinge fitting being composed unitarily of a metallic material and comprising:
a rectangular base,
a pair of cleats projecting from one side of said base along the long edges thereof, and
a pair of nonperforated lugs projecting from said side of said base along the short edges thereof and defining cheeks spaced outwardly from said cleats;
a generally hair pin-shaped clip swingable on said fitting, said clip being elongated and formed with a bight remote from said fitting, a pair of legs extending from said bight toward said fitting and received between said cheeks and said cleats, and a pair of inwardly turned feed on said legs received between said cleats, said cleats being bent around said feet to define a pivotal axis for said clip and having free ends substantially meeting at a plane of symmetry of said fitting through said axis, said feet being located completely within an enclosure formed by said cleats; and
a retaining member fixed in said body on said reverse side remote from said fitting and adapted to be straddled by said legs, said base being formed unitarily with a pair of tenons embedded in said body and anchoring said fitting thereto.

* * * * *